United States Patent
Leighton, II (10) Patent No.: US 10,132,695 B2
(45) Date of Patent: Nov. 20, 2018

(54) DETERMINING AN EXTREME TEMPERATURE LOCATION FROM A PLURALITY OF LOCATIONS

(71) Applicant: Parker-Hannifin Corporation, Cleveland, OH (US)

(72) Inventor: Harold Raymond Leighton, II, Charlotte, NC (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 235 days.

(21) Appl. No.: 15/030,983

(22) PCT Filed: Sep. 30, 2014

(86) PCT No.: PCT/US2014/058204
§ 371 (c)(1),
(2) Date: Apr. 21, 2016

(87) PCT Pub. No.: WO2015/061001
PCT Pub. Date: Apr. 30, 2015

(65) Prior Publication Data
US 2016/0238457 A1 Aug. 18, 2016

Related U.S. Application Data

(60) Provisional application No. 61/893,663, filed on Oct. 21, 2013.

(51) Int. Cl.
*G01K 3/14* (2006.01)
*G01K 1/02* (2006.01)

(52) U.S. Cl.
CPC .............. *G01K 3/14* (2013.01); *G01K 1/026* (2013.01); *G01K 2003/145* (2013.01)

(58) Field of Classification Search
CPC ..... G01K 3/14; G01K 1/026; G01K 2003/145
See application file for complete search history.

(56) References Cited

U.S. PATENT DOCUMENTS

| 4,440,509 A * | 4/1984 | Agarwal | G01K 1/026 340/870.17 |
| 5,158,362 A * | 10/1992 | Brauer | B64G 1/402 244/172.2 |

(Continued)

FOREIGN PATENT DOCUMENTS

| DE | 10 2006 052 039 A1 | 5/2008 |
| DE | 10 2010 062844 A1 | 6/2012 |

OTHER PUBLICATIONS

International Search Report and Written Opinion for corresponding Patent Application No. PCT/US2014/058204 dated Dec. 23, 2014.

*Primary Examiner* — Lisa Caputo
*Assistant Examiner* — Philip Cotey
(74) *Attorney, Agent, or Firm* — Renner, Otto, Boiselle & Sklar, LLP (57) ABSTRACT

A device for determining an extreme temperature location from a plurality of locations connects along a daisy chain of devices each of which mounts to a respective location from the plurality of locations. The device includes an input terminal operably connected to a remote device at a remote location from the plurality of locations via the daisy chain. The input terminal receives a remote temperature signal indicative of a remote temperature corresponding to the remote location and a remote location signal indicative of the remote location. The device also includes a local temperature determining logic that generates a local temperature signal indicative of a local temperature corresponding to the location of the device, and at least one comparator operably connected to the input terminal and to the local temperature (Continued)

determining logic and configured to compare the local temperature signal to the remote temperature signal.

20 Claims, 5 Drawing Sheets

(56) References Cited

U.S. PATENT DOCUMENTS

| | | | |
|---|---|---|---|
| 7,890,280 B2* | 2/2011 | Fomme | G01K 11/32 345/469 |
| 2004/0056753 A1* | 3/2004 | Chiang | G01K 3/14 338/22 R |
| 2006/0263912 A1* | 11/2006 | Arroyo | G01K 7/425 438/14 |
| 2006/0265174 A1* | 11/2006 | Doyle | G01K 1/026 702/130 |
| 2007/0081575 A1* | 4/2007 | Liu | G01K 7/203 374/111 |
| 2007/0211548 A1* | 9/2007 | Jain | G11C 5/04 365/211 |
| 2009/0202192 A1* | 8/2009 | Taverner | E21B 47/04 385/12 |
| 2009/0262781 A1* | 10/2009 | Shumaker | G01K 1/026 374/141 |
| 2010/0177801 A1* | 7/2010 | Geren | G01K 1/024 374/117 |
| 2011/0002358 A1* | 1/2011 | Sato | G01K 1/026 374/163 |
| 2011/0102183 A1* | 5/2011 | Tenchio | G01K 3/005 340/577 |
| 2011/0210703 A1 | 9/2011 | Souza et al. | |
| 2011/0301909 A1* | 12/2011 | Jackson | G01K 7/42 702/133 |
| 2013/0322492 A1* | 12/2013 | Butzmann | G01K 1/026 374/183 |
| 2014/0192835 A1* | 7/2014 | Caroff | H01L 23/34 374/15 |

* cited by examiner

FIG. 6

DETERMINING AN EXTREME TEMPERATURE LOCATION FROM A PLURALITY OF LOCATIONS

FIELD OF THE INVENTION

The present invention relates generally to tracking temperature in a system with the potential for overheating at multiple locations. More particularly, the invention relates to determining an extreme temperature location from a plurality of locations in the system.

BACKGROUND OF THE INVENTION

Conventional high power systems that connect a plurality of high power electrical components together generally utilize a flexible wire or cable connected to the electrical component. As these conventional systems have many disadvantages, systems have been developed that instead utilize bus bars. The bus bars provide advantages over conventional wire or cable connections including low manufacturing and assembly costs, high reliability, and improved control and organization in assembly.

As part of the high power system, the bus bars may carry a relatively large amount of current, which may cause the temperature of the bus bars to rise and in extreme cases to overheat. Moreover, if connections between the bus bars and other components of the system become lose or are otherwise inadequate, the connection points may heat up, which could be another cause of overheating. Overheating may adversely affect the bus bars and the overall system.

As part of the high power inverter system, the bus bars may also be at relatively high voltages.

The above is just one example of systems with potential for overheating at multiple locations combined with high disparate voltages from location to location, which may complicate efforts to deal with the overheating. Conventional methods for dealing with overheating may not account for the high voltage issue. Other methods may deal with the high voltage, but may require expensive insulation techniques and/or significant electrical circuitry for each monitored location.

SUMMARY OF THE INVENTION

The present invention overcomes the above problems by providing devices that may easily be mounted at the monitored locations. The devices may be connected in a daisy chain fashion and incorporate electronics that provide for an effective way to transmit temperature information and information regarding extreme temperature locations. The devices may each include a printed circuit board (PCB) with the electronics installed on one side of the PCB and the other side of the PCB facing the monitored location. In this arrangement the PCB provides adequate insulation from the high voltage at the monitored locations.

One aspect of the invention relates to a device for determining an extreme temperature location from a plurality of locations. The device is configured to connect along a daisy chain of devices, each of the devices configured to mount at a respective location from a plurality of locations. The device includes at least one input terminal configured to operably connect to a remote device at a remote location from the plurality of locations via the daisy chain, with at least one input terminal configured to receive a remote temperature signal including data indicative of a remote temperature corresponding to the remote location and a remote location signal including data indicative of the remote location. The device also includes a local temperature determining logic configured to generate a local temperature signal including data indicative of a local temperature corresponding to the location of the device.

The device further includes at least one comparator operably connected to the at least one input terminal and to the local temperature determining logic and configured to compare the local temperature signal to the remote temperature signal to determine which is higher of the local temperature and the remote temperature. The device also includes at least one output terminal and an output logic configured to, if the remote temperature is higher than the local temperature, output a temperature signal including data indicative of the remote temperature and a location signal including data indicative of the remote location via the at least one output terminal. The output logic is also configured to, if the local temperature is higher than the remote temperature, output a temperature signal including data indicative of the local temperature and a location signal including data indicative of the location of the device via the at least one output terminal.

In one embodiment, the device includes a printed circuit board on a first side of which the at least one input terminal, the local temperature determining logic including a temperature sensor, the at least one comparator, and the at least one output terminal are mounted, the printed circuit board configured to mount to the location with a second side opposite the first side facing the location so that the printed circuit board electrically insulates the at least one input terminal, the local temperature determining logic including the temperature sensor, the at least one comparator, and the at least one output terminal from the location.

In another embodiment, if the remote temperature is higher than the local temperature, the output logic outputs one of the remote location signal and the remote location signal plus an offset as the location signal including data indicative of the remote location. In one embodiment, the offset is between 0.45 and 0.55 volts.

In another aspect of the invention, a method of determining an extreme temperature location from a plurality of locations includes receiving, at a local device from a remote device located at a remote location from the plurality of locations and connected to the local device in a daisy chain, a remote location signal indicative of the remote location. The method also includes receiving, at the local device, a remote temperature signal indicative of a remote temperature corresponding to the remote location. The method also includes obtaining at the local device a local temperature signal indicative of a local temperature. The method also includes comparing at the local device the remote temperature signal to the local temperature signal. If the remote temperature is higher than the local temperature, the local device transmitting an output signal indicative of the remote temperature and an output signal indicative of the remote location. If the local temperature is higher than the remote temperature, the local device transmitting an output signal indicative of the local temperature and an output signal indicative of the location of the local device.

In yet another aspect of the invention, a system that determines an extreme temperature location from a plurality of locations includes a plurality of devices each installed at one location from the plurality of locations and connected along a daisy chain. Each of the devices determines a respective local temperature value at its respective location and compares the respective local temperature value to the remote temperature value received from a device up in the chain. If the received remote temperature value is, for example, higher than the local temperature value, the device outputs the remote temperature value along to the next device down the chain. Also, if the received remote temperature value is higher than the local temperature value, the device outputs the remote location to the next device down the chain. On the other hand, if the local temperature value is higher than the remote temperature value, the device outputs the local temperature value along to the next device down the chain.

One or more of the above and other aspects, objects, features and advantages of the present invention are accomplished using the invention described and claimed herein. Also it will be appreciated that one or more parts or features, etc., shown in one embodiment or drawing may be used in the same or a similar way in another embodiment.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to one or more embodiments, it is evident that equivalents and modifications will occur to others skilled in the art. The present invention includes all such equivalents and modifications, and is limited only by the scope of the claims.

DETAILED DESCRIPTION

Figure 1:
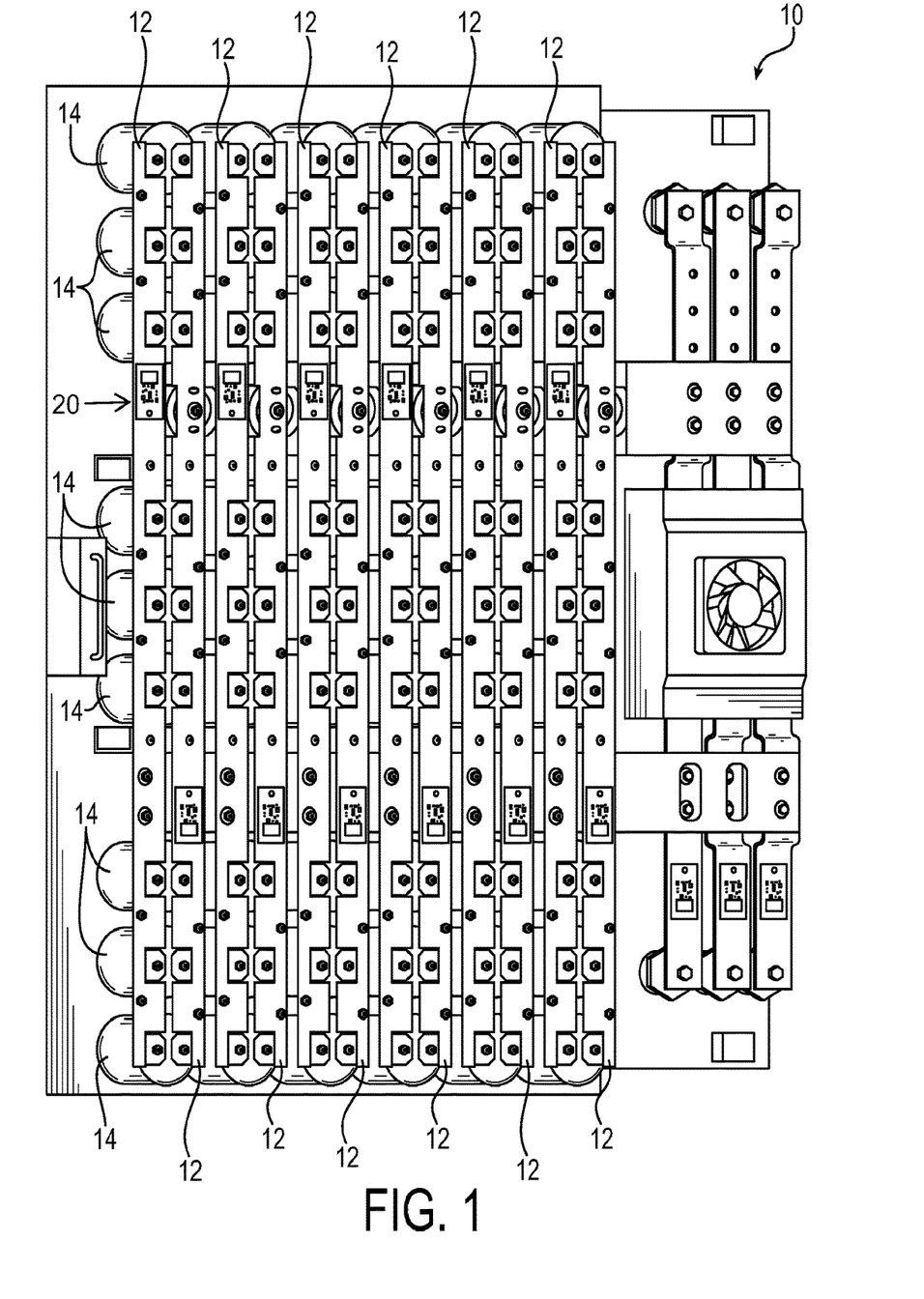
FIG. 1 illustrates an exemplary high power inverter system with the potential for overheating at multiple locations.

FIG. 1 illustrates an exemplary high power inverter system 10 that includes bus bars 12 coupled to capacitors 14 that form part of an inverter (AC to DC) for providing three-phase power to the electrical grid. The bus bars 12 provide advantages over conventional wire or cable connections including low manufacturing and assembly costs, high reliability, and improved control and organization in assembly.

As part of the high power inverter system 10, the bus bars 12 carry a relatively large amount of current at a relatively large potential (i.e., high voltage). The large amount of current causes the temperature of the bus bars 12 to rise. In extreme cases, the relatively large amount of current may cause the bus bars 12 to overheat. Moreover, if connections between the bus bars 12 and other components of the system 10 (e.g., the capacitors 14) become lose or are otherwise inadequate, the connection points may overheat because of increased contact resistance. Overheating may adversely affect the bus bars 12 and the overall system 10.

The system 10 also includes the devices 20. Each of the devices 20 is mounted on the system 10 to a location of interest at which temperature is to be monitored. In the illustrated embodiment of FIG. 1, the devices 20 are mounted to the bus bars 12 to monitor temperature of various locations on the bus bars 12. The devices 20 are connected in a daisy chain (not shown), which reduces the amount of cables and/or wires that must be run for the extreme temperature determining system to operate.

Thus, in the exemplary system 10 it is possible to track the temperature of multiple locations on the bus bars 12 and/or other components of the system 10, and take measures such as system throttling back or shutdown if overheating is detected at a particular location. It is also possible to determine where (i.e., at which location) in the system the extreme temperature occurs.

The exemplary system 10 is just one example of systems that combine potential for overheating at multiple locations with high disparate voltages from location to location, which may complicate efforts to deal with the overheating. The devices, systems and methods for determining extreme temperature locations disclosed herein are not limited to just this example, but may be incorporated in various other systems.

Figure 2:
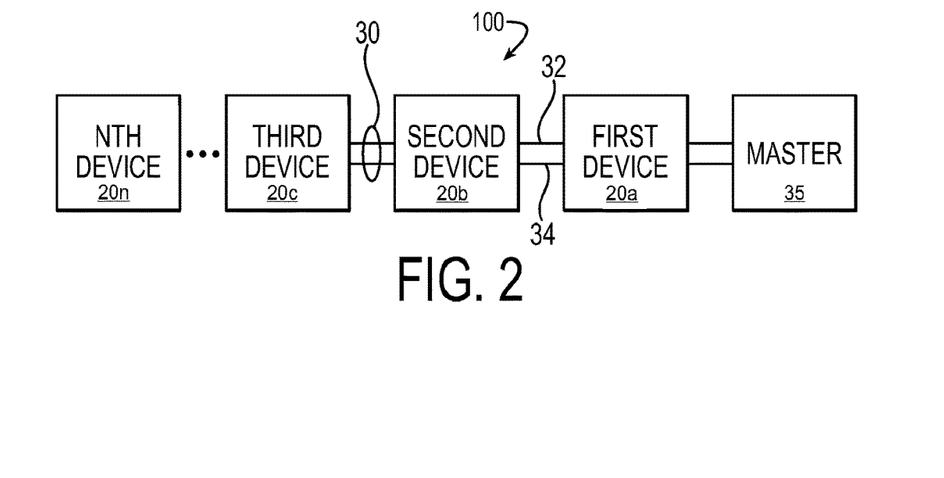
FIG. 2 illustrates an exemplary system for determining an extreme temperature location from a plurality of locations.

FIG. 2 illustrates an exemplary system 100 for determining an extreme temperature location from a plurality of locations. The system 100 incorporates the devices 20 described above, examples of which are the illustrated first device 20a, second device 20b, third device 20c, and Nth device 20n. The devices 20 connect along a daisy chain 30 that terminates at a master device 35 that ultimately receives the temperature information and the location information from the devices 20. The daisy chain 30 includes at least two lines: a temperature line 32 carrying temperature information and a location line 34 carrying location information.

Figure 3:
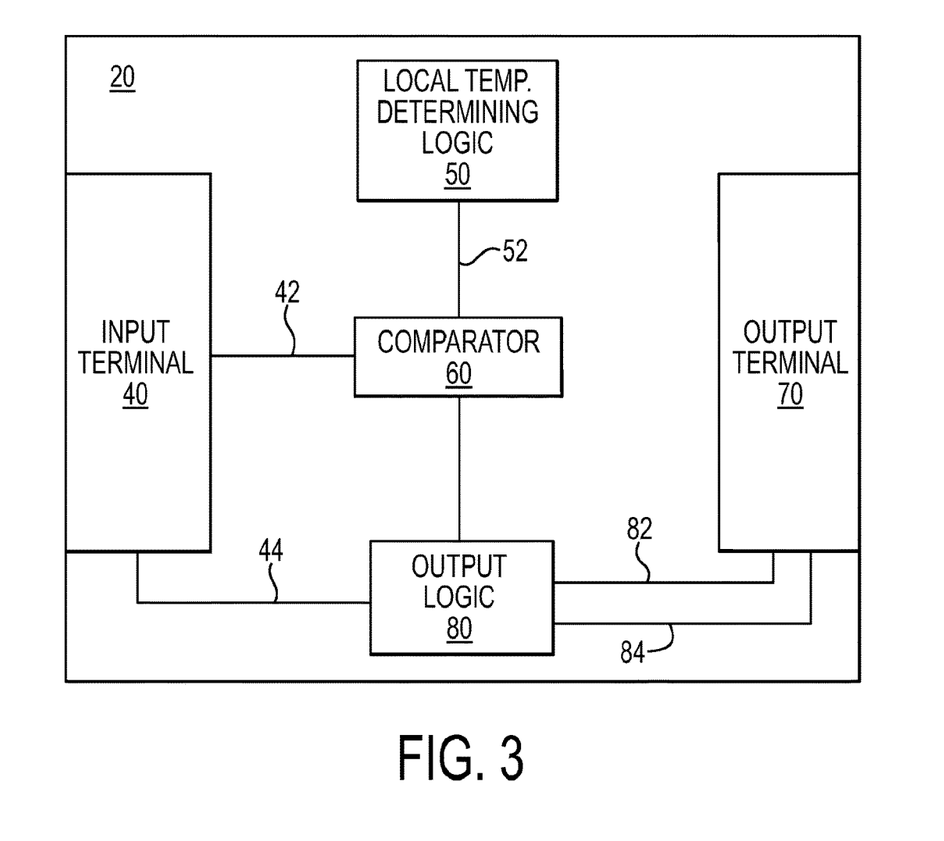
FIG. 3 illustrates a block diagram of an exemplary device in the system for determining an extreme temperature location from a plurality of locations.

FIG. 3 illustrates a block diagram of an exemplary device 20. The device 20 includes an input terminal 40 that connects to a remote device (not shown). For example, if the device 20 of FIG. 3 corresponded to the first device 20a of FIG. 2, the second device 20b of FIG. 2 would correspond to the remote device. Similarly, if the device 20 of FIG. 3 corresponded to the second device 20b of FIG. 2, the third device 20c of FIG. 2 would correspond to the remote device, and so on.

The input terminal 40 connects to the remote device via the daisy chain 30 and a corresponding output terminal of the remote device (not shown). The input terminal 40 connects to the temperature line 32 and the location line 34 of the daisy chain 30 to receive temperature and location information, respectively. Via these lines the input terminal 40 receives a remote temperature signal 42 and a remote location signal 44. In other embodiments, the device 20 may include more than one input terminal and thus the signals 42 and 44 may arrive at the device 20 via different input terminals.

The remote temperature signal 42 includes data that indicates a remote temperature that has been determined so far down the chain 30 to be the extreme temperature (i.e., hottest or coldest). The remote location signal 44 includes data that indicates the remote location corresponding to the remote temperature (i.e., the location that has been determined so far down the chain 30 to have the extreme temperature (i.e., hottest or coldest).

The device 20 further includes a local temperature determining logic 50 that generates a local temperature signal 52 that includes data that indicates a local temperature corresponding to the location of the device 20.

The device 20 also includes a comparator 60 (which could be embodied as one or more physical comparators) that receives the remote temperature signal 42 (or equivalent) and the local temperature signal 52 and compares them. In one embodiment, the comparator 60 determines which is higher of the local temperature and the remote temperature based on its comparison of the remote temperature signal 42 (or equivalent) and the local temperature signal 52. In another embodiment, the comparator 60 determines which is lower of the local temperature and the remote temperature based on its comparison of the remote temperature signal 42 (or equivalent) and the local temperature signal 52. In yet another embodiment, the comparator 60 determines relationships of the local temperature and the remote temperature other than higher or lower based on its comparison of the remote temperature signal 42 (or equivalent) and the local temperature signal 52.

The device 20 also includes an output terminal 70 and an output logic 80. Based on the comparison, the output logic 80 receives the output of the comparator 60 and outputs a temperature signal 82 and a location signal 84 via the output terminal 70. In other embodiments, the device 20 may include more than one output terminal and thus the device 20 may output the signals 82 and 84 via different output terminals.

In one embodiment, if the remote temperature is higher than the local temperature, the output logic 80 outputs a temperature signal 82 including data indicative of the remote temperature and a location signal 84 including data indicative of the remote location. Since the remote temperature detected previously as the extreme temperature is hotter than the local temperature, the remote temperature is passed down the chain as the hottest temperature. If the local temperature, however, is higher than the remote temperature, the output logic 80 outputs a temperature signal 82 including data indicative of the local temperature and a location signal 84 including data indicative of the location of the device 20.

In another embodiment, if the remote temperature is lower than the local temperature, the output logic 80 outputs a temperature signal 82 including data indicative of the remote temperature and a location signal 84 including data indicative of the remote location. If the local temperature, however, is lower than the remote temperature, the output logic 80 output a temperature signal 82 including data indicative of the local temperature and a location signal 84 including data indicative of the location of the device 20.

Figure 4:
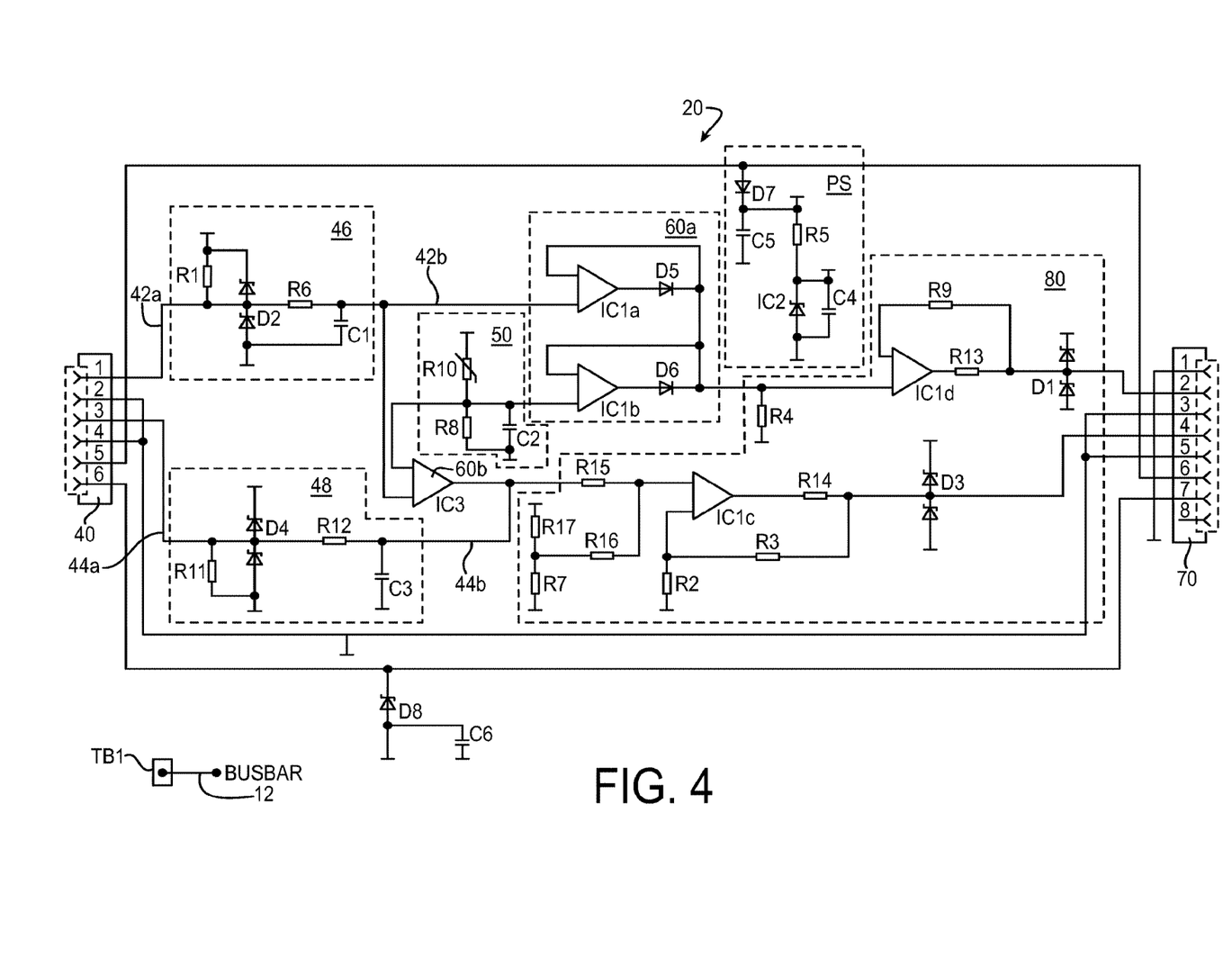
FIG. 4 illustrates a schematic drawing of the exemplary device for determining an extreme temperature location from a plurality of locations.

FIG. 4 illustrates a schematic drawing of an exemplary device 20. The device 20 includes the input terminal 40 and the output terminal 70 as discussed above. In the illustrated embodiment the device 20 includes input circuitry 46 and 48. Input circuitry 46 receives the remote temperature signal 42*a* and includes a pull-up resistor R1, a clamp D2 and an RC filter comprised by the resistor R6 and the capacitor C1. The output of the input circuitry 46 is a signal 42*b* that corresponds to the remote temperature signal 42*a*. Input circuitry 48 receives the remote location signal 44*a* and includes a pull-down resistor R11, a clamp D4 and an RC filter comprised by the resistor R12 and the capacitor C3. The output of the input circuitry 48 is a signal 44*b* that corresponds to the remote location signal 44*a*.

The device 20 includes the local temperature determining logic 50 including, in the embodiment of FIG. 4, a temperature sensor, which, in the illustrated embodiment, corresponds to the thermistor R10. In other embodiments, the temperature sensor corresponds to a device other than a thermistor (e.g., thermocouple, integrated circuit, transistor temperature sensor, diode temperature sensor, etc.) The local temperature determining logic 50 also includes the resistor R8 and the capacitor C2. The output of the local temperature determining logic 50 is the local temperature signal 52.

In the illustrated embodiment of FIG. 4, the device 20 includes comparator 60*a* comprised by operational amplifiers IC1*a* and IC1*b* and diodes D5 and D6. The comparator 60*a* receives the remote temperature signal 42*b* and the local temperature signal 52 and compares them. The output of the comparator 60*a* is approximately the higher of the remote temperature signal 42*b* and the local temperature signal 52.

The device 20 also includes the comparator 60*b*, which also receives the remote temperature signal 42*b* and the local temperature signal 52 and compares them. The output of the comparator 60*b* is approximately the remote location signal 44*b* if the remote temperature signal 42*b* is higher than the local temperature signal 52. The output of the comparator 60*b* is approximately zero volts if the local temperature signal 52 is higher than the remote temperature signal 42*b*.

The device 20 also includes the output logic 80, which in the embodiment of FIG. 4 includes the amplifier formed by the operational amplifier IC1*d* and the resistors R4, R9 and R13. Thus, if the remote temperature signal 42*b* is higher than the local temperature signal 52, the output logic 80 outputs the temperature signal 82 as a signal corresponding to the remote temperature. If the local temperature signal 52 is higher than the remote temperature signal 42*b*, the output logic 80 outputs the temperature signal 82 as a signal corresponding to the local temperature.

In an alternative embodiment (not shown), if the remote temperature signal 42*b* is lower than the local temperature signal 52, the output logic 80 outputs the temperature signal 82 as a signal corresponding to the remote temperature and, If the local temperature signal 52 is lower than the remote temperature signal 42*b*, the output logic 80 outputs the temperature signal 82 as a signal corresponding to the local temperature.

The output logic 80, in the embodiment of FIG. 4, also includes the offset circuit formed by the resistors R7, R15, R16 and R17, and the amplifier formed by the operational amplifier IC1*c* and the resistors R2, R3 and R14. Thus, if the remote temperature signal 42*b* is higher than the local temperature signal 52, the output logic 80 outputs the remote location signal 44*b* plus an offset as the location signal 84 including data indicative of the remote location. In the embodiment of FIG. 4, the offset is approximately 0.5 volts or between 0.45 and 0.55 volts.

At the end of the daisy chain 30 the offset voltages add up to a voltage that is indicative of which of the devices 20 along the daisy chain reports the most extreme temperature. Along the chain 30, any device 20 that reports a temperature more extreme than the previously reported most extreme temperature effectively shorts out (i.e., initializes) the offset, thus identifying itself as the device 20 reporting the most extreme temperature.

In an alternative embodiment (not shown), if the remote temperature signal 42*b* is lower than the local temperature signal 52, the output logic 80 outputs the remote location signal 44*b* plus an offset as the location signal 84 including data indicative of the remote location.

In the illustrated embodiment of FIG. 4, the device 20 outputs the temperature signal 82 and the location signal 84 via the output terminal 70. In the illustrated embodiment, the device 20 also includes the output clamps D1 and D3 and the power supply PS.

The embodiment of FIG. 4 is disclosed as an example of how the device 20 may be implemented. The device 20 of FIG. 4, however, is only one example of how the device 20 may be implemented and the device 20 may be implemented in other analog implementations, digital implementations or combination analog/digital implementations.

Returning to the embodiment of FIG. 2, the system 100 determines an extreme temperature location from a plurality of locations. If the devices 20 are each installed at one location from the plurality of locations and connected along the daisy chain 30, each of the devices 20 determines a respective local temperature value at its respective location and compares the respective local temperature value to the remote temperature value received from the device 20 to its left in the block diagram of FIG. 2. If the received remote temperature value is, for example, higher than the local temperature value, the device 20 outputs the remote temperature value along to the next device 20 to its right.

Also, if the received remote temperature value is higher than the local temperature value, the device 20 outputs the remote location to the next device 20. On the other hand, if the local temperature value is higher than the remote temperature value, the device 20 outputs the local temperature value along to the next device 20 to its right. Thus, the local temperature value becomes the new hottest temperature value. Also, if the local temperature value is higher than the remote temperature value, the device 20 outputs the location of the device 20 at which the new hottest temperature value was determined along to the next device 20 to its right.

Similar results are obtained in embodiments where it is desired to determine lowest temperature value and location. The information regarding the extreme temperature and extreme temperature location is passed to the right along the daisy chain 30 as disclosed above.

At the end of the daisy chain 30, the master device 35 receives the temperature and location information from the first device 20a, which corresponds to the extreme temperature and extreme temperature location along the system 100.

Figure 5:
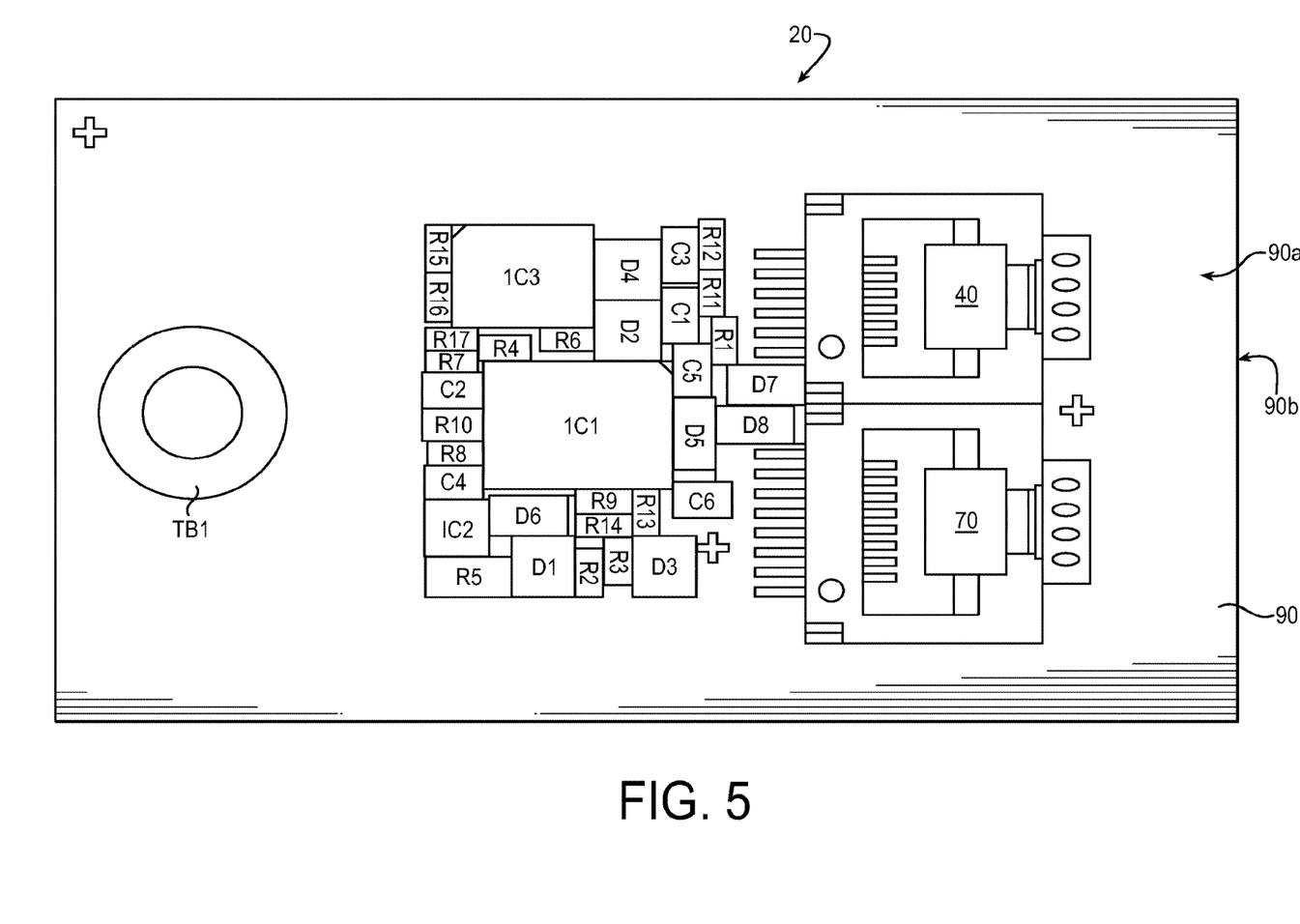
FIG. 5 illustrates an exemplary device for determining an extreme temperature location from a plurality of locations that includes a printed circuit board (PCB).

FIG. 5 illustrates an exemplary device 20 that includes a printed circuit board (PCB) 90. The PCB 90 may be fabricated of known materials such as FR-4. In the illustrated embodiment, must of the electronics discussed above in reference to FIG. 4 including the local temperature determining logic, the at least one comparator, the at least one output terminal and the temperature sensor are mounted to a first side 90a of the PCB 90. In alternative embodiments, less than all of the electronic components are mounted to the first side 90a of the PCB 90. For example, in one embodiment (not shown) the temperature sensor may be mounted directly to the location being monitored or somewhere else other than the PCB 90.

In the illustrated embodiment, most, if not all of the electronic components mounted to the PCB 90 are surface mount components and, as shown in FIG. 1, the device 20 is mounted such that the second side 90b of the PCB 90 opposite the first side 90a faces the location whose temperature is to be monitored. In this arrangement, the PCB 90 electrically insulates the electronic components mounted on the PCB 90 from the location being monitored.

As illustrated in FIG. 5, the device 20 may include a mounting terminal TB1 or more terminals through which hardware may be installed to mount the device 20 to the location being monitored.

Figure 6:
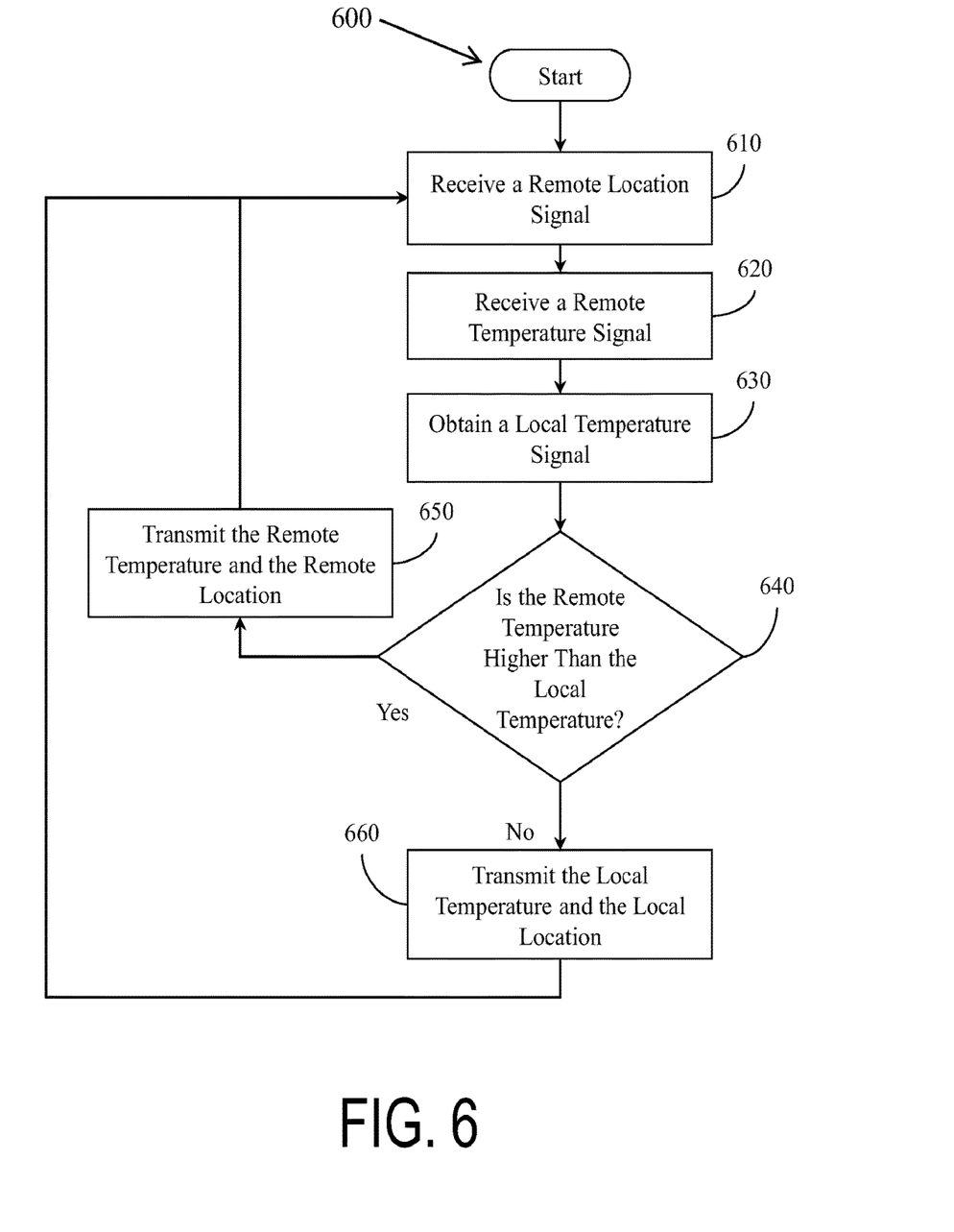
FIG. 6 illustrates a flow diagram of an exemplary method of determining an extreme temperature from a plurality of locations.

Example methods may be better appreciated with reference to the flow diagram of FIG. 6. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional, not illustrated blocks.

In the flow diagrams, blocks denote "processing blocks" that may be implemented with logic. The processing blocks may represent a method step or an apparatus element for performing the method step. A flow diagram does not depict syntax for any particular analog implementation, programming language, methodology, or style (e.g., procedural, object-oriented). Rather, a flow diagram illustrates functional information one skilled in the art may employ to develop logic to perform the illustrated processing. It will be appreciated that in some examples, elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. While FIG. 6 illustrates various actions occurring in serial, it is to be appreciated that various actions illustrated in FIG. 6 could occur substantially in parallel.

FIG. 6 illustrates a flow diagram of an exemplary method 600 of determining an extreme temperature location from a plurality of locations. The method 600 includes, at 610, receiving, at a local device from a remote device located at a remote location from the plurality of locations and connected to the local device in a daisy chain, a remote location signal indicative of the remote location. At 620, the method 600 further includes receiving, at the local device, a remote temperature signal indicative of a remote temperature corresponding to the remote location. At 630, the method 600 also includes obtaining at the local device a local temperature signal indicative of a local temperature. In one embodiment, determining the local temperature includes sensing the local temperature by use of a temperature sensor.

With the remote and local temperature on hand the method 600 may further include, at 640, comparing at the local device the remote temperature signal to the local temperature signal. At 650, if the remote temperature is higher than the local temperature, the local device transmits an output signal indicative of the remote temperature and an output signal indicative of the remote location. At 660, however, if the local temperature is higher than the remote temperature, the local device transmits an output signal indicative of the local temperature and an output signal indicative of the location of the local device.

A similar process is followed in embodiments where it is desired to determine the lowest temperature value and location. If the remote temperature is lower than the local temperature, the local device transmits an output signal indicative of the remote temperature and an output signal indicative of the remote location. However, if the local temperature is lower than the remote temperature, the local device transmits an output signal indicative of the local temperature and an output signal indicative of the location of the local device.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, operational amplifiers, comparators, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted or detected.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A device for a system for determining an extreme temperature location from a plurality of locations, the system comprising a plurality of devices connected in a daisy chain, the device configured to be one of the devices in the plurality of devices connected in the daisy chain, each of the devices in the plurality of devices connected in the daisy chain configured to mount at a respective location from the plurality of locations, the device comprising:
   at least one input terminal configured to operably connect via the daisy chain to a remote device from the plurality of devices connected in the daisy chain, the remote device located at a remote location, from the plurality of locations, remote from a location of the device, also from the plurality of locations, the at least one input terminal configured to receive a remote temperature signal including data indicative of a remote temperature corresponding to the remote location and a remote location signal including data indicative of the remote location;
   a local temperature determining logic configured to generate a local temperature signal including data indicative of a local temperature corresponding to the location of the device;
   at least one comparator operably connected to the at least one input terminal and to the local temperature determining logic and configured to compare the local temperature signal to the remote temperature signal to determine which is higher of the local temperature and the remote temperature;
   at least one output terminal; and
   an output logic configured to:
      if the remote temperature is higher than the local temperature, output a temperature signal including data indicative of the remote temperature and a location signal including data indicative of the remote location via the at least one output terminal, and
      if the local temperature is higher than the remote temperature, output a temperature signal including data indicative of the local temperature and a location signal including data indicative of the location of the device via the at least one output terminal.

2. The device of claim 1, comprising:
   a temperature sensor that forms part of the local temperature determining logic; and
   a printed circuit board on a first side of which the temperature sensor is mounted, the printed circuit board configured to mount to the location with a second side opposite the first side facing the location so that the printed circuit board electrically insulates the temperature sensor from the location.

3. The device of claim 1, comprising:
   a temperature sensor that forms part of the local temperature determining logic; and
   a printed circuit board on a first side of which the at least one input terminal, the local temperature determining logic including the temperature sensor, the at least one comparator, and the at least one output terminal are mounted, the printed circuit board configured to mount to the location with a second side opposite the first side facing the location so that the printed circuit board electrically insulates the at least one input terminal, the local temperature determining logic including the temperature sensor, the at least one comparator, and the at least one output terminal from the location.

4. The device of claim 1, comprising:
   a printed circuit board on a first side of which the at least one input terminal, the at least one comparator, and the at least one output terminal are mounted, the printed circuit board configured to mount to the location with a second side opposite the first side facing the location so that the printed circuit board electrically insulates the at least one input terminal, the at least one comparator, and the at least one output terminal from the location.

5. The device of claim 1, comprising:
a printed circuit board on a first side of which at least one of the at least one input terminal, the at least one comparator, and the at least one output terminal are mounted, wherein the location corresponds to a portion of a current carrying bus bar at a certain potential, wherein the printed circuit board mounts to the current carrying bus bar and effectively insulates the at least one input terminal, the at least one comparator, or the at least one output terminal mounted to the circuit board.

6. The device of claim 1, comprising:
a temperature sensor that forms part of the local temperature determining logic;
a printed circuit board on a first side of which the temperature sensor is mounted, wherein the location corresponds to a portion of a current carrying bus bar at a certain potential, wherein the printed circuit board operably mounts to the current carrying bus bar and effectively insulates the temperature sensor mounted to the circuit board while permitting the temperature sensor to effectively sense a temperature corresponding to the portion of the current carrying bus bar.

7. The device of claim 1, wherein the output logic is configured to:
if the remote temperature is higher than the local temperature, output one of the remote location signal and the remote location signal plus an offset as the location signal including data indicative of the remote location.

8. The device of claim 1, wherein the output logic is configured to:
if the remote temperature is higher than the local temperature, output the remote location signal plus an offset of between 0.45 and 0.55 volts as the location signal including data indicative of the remote location.

9. The device of claim 1, wherein the output logic is configured to:
if the local temperature is higher than the remote temperature, output one of substantially zero volts and between 0.45 and 0.55 volts as the location signal including data indicative of the location of the device.

10. A method of determining a hottest location from a plurality of locations by using a plurality of devices communicatively connected in a daisy chain, each device from the plurality of devices located at a respective location from the plurality of locations, the plurality of devices including a local device and a remote device, the local device located at a location from the plurality of locations and the remote device located at a remote location from the plurality of locations remote to the location of the local device, the method comprising:
receiving, at the local device from the remote device a remote location signal indicative of the remote location;
receiving, at the local device, a remote temperature signal indicative of a remote temperature corresponding to the remote location;
obtaining at the local device a local temperature signal indicative of a local temperature;
comparing at the local device the remote temperature signal to the local temperature signal; and
if the remote temperature is higher than the local temperature, the local device transmitting an output signal indicative of the remote temperature and an output signal indicative of the remote location; or
if the local temperature is higher than the remote temperature, the local device transmitting an output signal indicative of the local temperature and an output signal indicative of the location of the local device.

11. The method of claim 10 comprising:
at the remote device located at the remote location:
transmitting a signal indicative of the remote temperature to be received by the local device as the remote temperature signal indicative of the remote temperature, and
transmitting a signal indicative of the remote location to be received by the local device as the remote location signal indicative of the remote location.

12. The method of claim 10, wherein the determining the local temperature includes:
sensing the local temperature by use of a temperature sensor mounted to a first side of a printed circuit board, the printed circuit board mounted to the location with a second side of the printed circuit board opposite the first side facing the location so that the printed circuit board electrically insulates the temperature sensor from the location.

13. The method of claim 10, wherein
the local device is mounted to a portion of a bus bar, and
the determining the local temperature includes:
sensing the local temperature by use of a temperature sensor mounted to a first side of a printed circuit board, the printed circuit board mounted to the portion of the bus bar with a second side of the printed circuit board opposite the first side facing the portion of the bus bar so that the printed circuit board electrically insulates the temperature sensor from the portion of the bus bar.

14. The method of claim 10, wherein
the local device is mounted to a portion of a bus bar and the remote device is mounted to one of a remote portion of the bus bar or a portion of a remote bus bar,
the obtaining of the local temperature signal includes sensing the local temperature by use of a temperature sensor mounted to a first side of a printed circuit board, the printed circuit board mounted to the portion of the bus bar with a second side of the printed circuit board opposite the first side facing the portion of the bus bar so that the printed circuit board electrically insulates the temperature sensor from the portion of the bus bar while permitting the temperature sensor to effectively sense the local temperature, and
obtaining a signal indicative of the remote temperature includes sensing the remote temperature by use of a remote temperature sensor mounted to a first side of a remote printed circuit board, the remote printed circuit board mounted to the one of the remote portion of the bus bar or the portion of the remote bus bar with a second side of the remote printed circuit board opposite the first side facing the one of the remote portion of the bus bar or the portion of the remote bus bar so that the printed circuit board electrically insulates the temperature sensor from the one of the remote portion of the bus bar or the portion of the remote bus bar while permitting the remote temperature sensor to effectively sense the remote temperature.

15. The method of claim 10, wherein,
if the remote temperature is higher than the local temperature, the local device transmits one of the input signal indicative of the remote location or the input signal indicative of the remote location plus an offset as the output signal indicative of the remote location.

16. The method of claim 10, wherein,
if the remote temperature is higher than the local temperature, the local device transmits the input signal indicative of the remote location plus an offset of between 0.45 and 0.55 volts as the output signal indicative of the remote location.

17. The method of claim 10, wherein,
if the local temperature is higher than the remote temperature, the local device transmits one of substantially zero volts and between 0.45 and 0.55 volts as the output signal indicative of the location of the local device.

18. A system for determining an extreme temperature location from a plurality of locations, the system comprising:
a plurality of devices connected in a daisy chain, each of the devices configured to determine a respective temperature value at a respective location from the plurality of locations, the plurality of devices including:
  a first device located at a first location from the plurality of locations,
  a second device located at a second location from the plurality of locations, and
  a third device located at a third location from the plurality of locations,
  the first device including:
    a first temperature determining logic configured to generate a first temperature signal including data indicative of a first temperature corresponding to the first location;
    a first temperature sensor that forms part of the first temperature determining logic;
    a first printed circuit board on a first side of which the first temperature sensor is mounted, the first printed circuit board configured to mount to the first location with a second side of the first printed circuit board opposite the first side facing the first location so that the first printed circuit board electrically insulates the first temperature sensor from the first location;
    at least one first input terminal configured to operably connect to the second device via the daisy chain, the at least one first input terminal configured to receive from the second device a temperature signal including data indicative of a temperature corresponding to an extreme temperature location from a plurality of locations up to the second device and a location signal including data indicative of a device from the plurality of devices corresponding to the extreme temperature location from the plurality of locations up to the second device; and
    at least one first comparator operably connected to the at least one first input terminal and to the first temperature determining logic and configured to compare the first temperature signal to the temperature corresponding to the extreme temperature location from the plurality of locations up to the second device;
  the second device including:
    a second temperature determining logic configured to generate a second temperature signal including data indicative of a second temperature corresponding to the second location;
    a second temperature sensor that forms part of the second temperature determining logic;
    a second printed circuit board on a first side of which the second temperature sensor is mounted, the second printed circuit board configured to mount to the second location with a second side of the second printed circuit board opposite the first side facing the second location so that the second printed circuit board electrically insulates the second temperature sensor from the second location;
    at least one second input terminal configured to operably connect to the third device via the daisy chain, the at least one second input terminal configured to receive from the third device a temperature signal including data indicative of a temperature corresponding to an extreme temperature location from a plurality of locations up to the third device and a location signal including data indicative of a device from the plurality of devices corresponding to the extreme temperature location from the plurality of locations up to the third device; and
    at least one second comparator operably connected to the at least one second input terminal and to the second temperature determining logic and configured to compare the second temperature signal to the temperature corresponding to the extreme temperature location from the plurality of locations up to the third device.

19. The system of claim 18, wherein,
the first device includes:
  at least one first output terminal; and
  a first output logic configured to:
    if the temperature corresponding to the extreme temperature location from the plurality of locations up to the second device is higher than the first temperature, output a temperature signal including data indicative of the temperature corresponding to the extreme temperature location from the plurality of locations and a location signal including data indicative of the device from the plurality of devices corresponding to the extreme temperature location from the plurality of locations via the at least one first output terminal, and
    if the first temperature is higher than the temperature corresponding to the extreme temperature location from the plurality of locations up to the second device, output a temperature signal including data indicative of the first temperature and a location signal including data indicative of the location of the first device via the at least one first output terminal; and
the second device includes:
  at least one second output terminal operably connected to the first device; and
  a second output logic configured to:
    if the temperature corresponding to the extreme temperature location from the plurality of locations up to the third device is higher than the second temperature, output the temperature signal including data indicative of the temperature corresponding to the extreme temperature location from the plurality of locations up to the second device and the location signal including data indicative of the device from the plurality of devices corresponding to the extreme temperature location from the plurality of locations up to the second device via the at least one second output terminal, and if the second temperature is higher than the temperature corresponding to the extreme temperature location from the plurality of locations up to the third device, output a temperature signal including data indicative of the second temperature and a location signal including data indicative of the location of the second device via the at least one second output terminal.

20. The system of claim 18, wherein, if the temperature corresponding to the extreme temperature location from the plurality of locations up to the third device is higher than the second temperature, the second device outputs the location signal including data indicative of the device from the plurality of devices corresponding to the extreme temperature location from the plurality of locations up to the second device as the location signal including data indicative of the device from the plurality of devices corresponding to the extreme temperature location from the plurality of locations up to the third device plus an offset, and if the temperature corresponding to the extreme temperature location from the plurality of locations up to the second device is higher than the first temperature, the first device outputs the location signal including data indicative of the device from the plurality of devices corresponding to the extreme temperature location from the plurality of locations as the location signal including data indicative of the device from the plurality of devices corresponding to the extreme temperature location from the plurality of locations up to the second device plus an additional offset, a value including the sum of the offset and the additional offset indicates the extreme temperature location.

\* \* \* \* \*